(12) United States Patent
Graham (10) Patent No.: US 8,091,590 B2
(45) Date of Patent: Jan. 10, 2012

(54) NITROGEN TIRE INFLATION SYSTEM AND METHOD

(76) Inventor: Samuel S. Graham, Kannapolis, NC (US)

( * ) Notice: Subject to any disclaimer, the term of this patent is extended or adjusted under 35 U.S.C. 154(b) by 777 days.

(21) Appl. No.: 12/179,376

(22) Filed: Jul. 24, 2008

(65) Prior Publication Data
US 2009/0025821 A1   Jan. 29, 2009

Related U.S. Application Data (60) Provisional application No. 60/952,160, filed on Jul. 26, 2007.

(51) Int. Cl.
*B65B 31/00* (2006.01)
(52) U.S. Cl. ............ 141/38; 141/2; 141/8; 141/61
(58) Field of Classification Search ............ 141/2, 8, 141/38, 59, 61, 94, 95
See application file for complete search history.

(56) References Cited

U.S. PATENT DOCUMENTS

| | | | | |
|---|---|---|---|---|
| 3,208,574 A * | 9/1965 | Anson | ............ | 194/216 |
| 4,236,622 A * | 12/1980 | Stevenson | ............ | 194/296 |
| 4,289,225 A * | 9/1981 | Scholta | ............ | 194/241 |
| 5,588,984 A * | 12/1996 | Verini | ............ | 95/15 |
| 5,891,277 A * | 4/1999 | Bachhuber | ............ | 152/415 |
| 6,155,313 A * | 12/2000 | Smalley | ............ | 141/38 |
| 6,170,542 B1 * | 1/2001 | Loureiro Benimeli | ............ | 141/192 |
| 7,137,417 B2 * | 11/2006 | Kroll et al. | ............ | 141/66 |
| 7,174,925 B2 * | 2/2007 | Fritz, II | ............ | 141/38 |
| 7,624,774 B2 * | 12/2009 | Lighter | ............ | 141/237 |

\* cited by examiner

*Primary Examiner* — Timothy L Maust
(74) *Attorney, Agent, or Firm* — Clements Bernard PLLC; Lawrence A. Baratta, Jr.; Christopher L. Bernard (57) ABSTRACT

The present disclosure provides a nitrogen tire inflation and deflation system and associated usage methods. In one exemplary embodiment, the system includes a dispenser and a nitrogen storage device along with an associated usage method. In another exemplary embodiment of the present disclosure, a decommissioned pay phone is converted into an air or nitrogen dispenser. The conversion utilizes the form-factor and payment component of the pay phone with the additional of parts to regulate air flow. Advantageously, this provides an environmental solution to waste disposal of decommissioned pay phones. The air/nitrogen dispenser of the present disclosure can be placed at gasoline stations, convenience stores, car washes, and the like.

16 Claims, 9 Drawing Sheets

NITROGEN TIRE INFLATION SYSTEM AND METHOD

CROSS-REFERENCE TO RELATED APPLICATION(S)

The present non-provisional patent application claims priority to U.S. Provisional Patent Application Ser. No. 60/952,160, filed Jul. 26, 2007, and entitled "NITROGEN TIRE INFLATION SYSTEM AND METHOD," which is incorporated in full by reference herein.

FIELD OF THE DISCLOSURE

The present disclosure relates generally a tire inflation system and method, and more particularly, to a system for nitrogen tire inflation and an associated usage method and assembly method through converting a decommissioned pay telephone. The system utilizes stored gas, and in an exemplary embodiment, the system can be assembled utilizing a decommissioned pay phone.

BACKGROUND OF THE DISCLOSURE

Traditionally, vehicle tires are filled with compressed air. Compressed air when dry consists of about 78 percent nitrogen, 21 percent oxygen, and 1 percent other gases by volume. Water vapor (humidity) can make up as much as 5 percent of the volume of air under worst-case conditions. Nitrogen is becoming a popular replacement for standard air in vehicle tires. When it comes to tire inflation, nitrogen has many advantages over compressed air. With nitrogen tire inflation, improvements can be noted in a vehicle's handling, fuel efficiency and tire life through better tire pressure retention, improved fuel economy and cooler running tire temperatures. See, for example, www.getnitrogen.org.

Filling vehicle tires with nitrogen mainly does two things: it eliminates moisture, and it replaces smaller oxygen molecules with larger nitrogen molecules, reducing the rate at which compressed gas diffuses through porous tire walls. That can mean that a tire filled with nitrogen retains optimal pressure longer, leading to more uniform tire wear and better gas mileage. For example, tires inflated to 32 psi (pounds-per-square inch) get 3 percent better mileage than at 24 psi thus providing fuel economy benefits to drivers. Under-inflated tires are a leading cause of tire blowouts leading to potential accidents and vehicle damage. Nitrogen-inflated tires have been shown to retain pressure longer.

For example, many race car teams use nitrogen instead of compressed air in their tires because nitrogen has a much more consistent rate of expansion and contraction compared to the usual air. A half pound of pressure will radically affect traction and handling. With track and tire temperatures varying over the duration of a race, the consistency of nitrogen is needed.

Nitrogen pressure is more consistent than normal air pressure, because air typically contains varying amounts of moisture due to changes in the relative humidity on race day. Water causes air to be inconsistent in its rate of expansion and contraction. So, a humid race in the southeast United States or a dry race in the desert western United States could make for unpredictable tire pressures if dry nitrogen were not used.

Currently, tire retailers are providing drivers an opportunity to fill up tires with Nitrogen. Ingersoll-Rand Corp. of Montvale, N.J., USA manufactures a Nitrogen Tire Inflation System. However, this system is cost-prohibitive for gasoline stations, convenience stores, cash wash providers, and the like. This system utilizes a semi-permeable membrane to filter nitrogen from ambient air to provide up to 95% pure nitrogen for tire inflation. As such, it is not economical to provide such a system for consumers.

Conventionally, air inflation devices are commonly located at gasoline stations, convenience stores, car washes, and the like. In the past, pay telephones were also located at such locations as well as many other locations. However, pay telephones are being decommissioned with the widespread adoption of cellular telephones. One problem associated with decommissioned pay phones is disposal. What has not been explored in the art is a method of converting decommissioned pay phones to become air or nitrogen inflation devices.

What is needed is a nitrogen tire inflation system which can be located at a gasoline station, convenience store, cash wash provider, and the like which can allow drivers the opportunity to deflate tires filled with compressed air and then inflate with nitrogen.

BRIEF SUMMARY OF THE DISCLOSURE

In various exemplary embodiments, the present disclosure provides a nitrogen tire inflation and deflation system and associated usage methods. In one exemplary embodiment, the system includes a dispenser and a nitrogen storage device along with an associated usage method. In another exemplary embodiment of the present disclosure, a decommissioned pay phone is converted into an air or nitrogen dispenser. The conversion utilizes the form-factor and payment component of the pay phone with the additional of parts to regulate air flow. Advantageously, this provides an environmental solution to waste disposal of decommissioned pay phones. The air/nitrogen dispenser of the present disclosure can be placed at gasoline stations, convenience stores, car washes, and the like.

In an exemplary embodiment, a tire inflation system includes a housing; a refillable gas storage device disposed to the housing; a regulator disposed to the refillable gas storage device, wherein the regulator is configured to dispense gas from the gas storage device responsive to a payment; a payment mechanism disposed within the housing, wherein the payment mechanism is configured to receive the payment; and an inflation device moveably attached to the housing and connected to the regulator and the refillable gas storage device, wherein the inflation device is configured to attach to a valve and dispense the gas through the valve. The gas can include nitrogen gas. The tire inflation system can further include a deflation device moveably attached to the housing, wherein the deflation device is configured to deflate a tire. Optionally, the housing is constructed from a decommissioned payphone. The payment mechanism can include a coin acceptor; and wherein the regulator is driven by a timer connected to the coin acceptor within the housing. The housing can include a plurality of status indicators configured to provide a visual status representation; wherein a first indicator of the plurality of status indicators provides an indication that the tire inflation system is in service; and wherein a second indicator of the plurality of status indicators provides a visual representation of a fill state of the refillable gas storage device. A third indicator is connected to a pressure sensor configured to measure pressure in the refillable gas storage device. The tire inflation system can further include a communication mechanism configured to notify an operator responsive to a low fill in the refillable gas storage device. Optionally, payment mechanism includes any of a coin acceptor, a bill acceptor, a credit card reader, a debit card reader, and a prepaid card reader. The payment mechanism can be configured to dispense a card for a dust cap for each tire filled.

In another exemplary embodiment, a nitrogen tire inflation system includes a payphone housing; a refillable nitrogen gas storage device disposed to the payphone housing; a regulator disposed to the refillable nitrogen gas storage device, wherein the regulator is configured to dispense nitrogen gas through a hose from the refillable nitrogen gas storage device responsive to a payment; a payment mechanism disposed within the payphone housing, wherein the payment mechanism is configured to receive the payment; and an inflation device moveably attached to the housing through the hose and connected to the regulator and the refillable nitrogen gas storage device, wherein the inflation device is configured to attach to a tire valve and dispense the nitrogen gas through the tire valve. The nitrogen tire inflation system can further include a deflation device moveably attached to the housing through a cord, wherein the deflation device is configured to deflate a tire to remove ambient air prior to filling the tire with nitrogen gas. The payment mechanism can include a coin acceptor in the payphone housing from a decommissioned payphone; and wherein the regulator is driven by a timer connected to the coin acceptor within the payphone housing. The payphone housing can include a plurality of status indicators configured to provide a visual status representation; wherein the plurality of status indicators comprise light emitting diodes; wherein a first indicator of the plurality of status indicators provides an in service indication; wherein a second indicator of the plurality of status indicators provides a an indication that payment is accepted and gas is ready to dispense; and herein a third indicator of the plurality of status indicators provides a tank low indication. The third indicator is connected to a pressure sensor configured to measure pressure in the refillable gas storage device; and wherein the nitrogen tire inflation system further includes a communication mechanism configured to notify an operator responsive to a low fill in the refillable nitrogen gas storage device. Optionally, the payment mechanism includes a bill reader; wherein the bill reader is configured to accept paper currency; and wherein the bill reader includes a prepaid card dispenser converted from a decommissioned phone card dispenser.

In another exemplary embodiment, a method of converting decommissioned payphone equipment into a tire inflation system includes procuring a decommissioned payphone; removing phone-related components from the decommissioned payphone; adding a gas storage tank to the decommissioned payphone; procuring a plurality of parts to regulate gas dispensing from the gas storage tank responsive to a payment; and adding the plurality of parts to the decommissioned payphone. The method can further include procuring a decommissioned prepaid phone card dispenser; and converting the decommissioned prepaid phone card dispenser to dispense nitrogen and cards for a dust cap. The method optionally can further include filling the gas storage tank with nitrogen gas.

BRIEF DESCRIPTION OF THE DRAWINGS

The present disclosure is illustrated and described herein with reference to the various drawings, in which like reference numbers denote like system components and/or method steps, respectively, and in which.

DETAILED DESCRIPTION OF THE DISCLOSURE

In various exemplary embodiments, the present disclosure provides a nitrogen tire inflation and deflation system and associated usage methods. In one exemplary embodiment, the system includes a dispenser and a nitrogen storage device along with an associated usage method. In another exemplary embodiment of the present disclosure, a decommissioned pay phone is converted into an air or nitrogen dispenser. The conversion utilizes the form-factor and payment component of the pay phone with the additional of parts to regulate air flow. Advantageously, this provides an environmental solution to waste disposal of decommissioned pay phones. The air/nitrogen dispenser of the present disclosure can be placed at gasoline stations, convenience stores, car washes, and the like.

Figure 1:
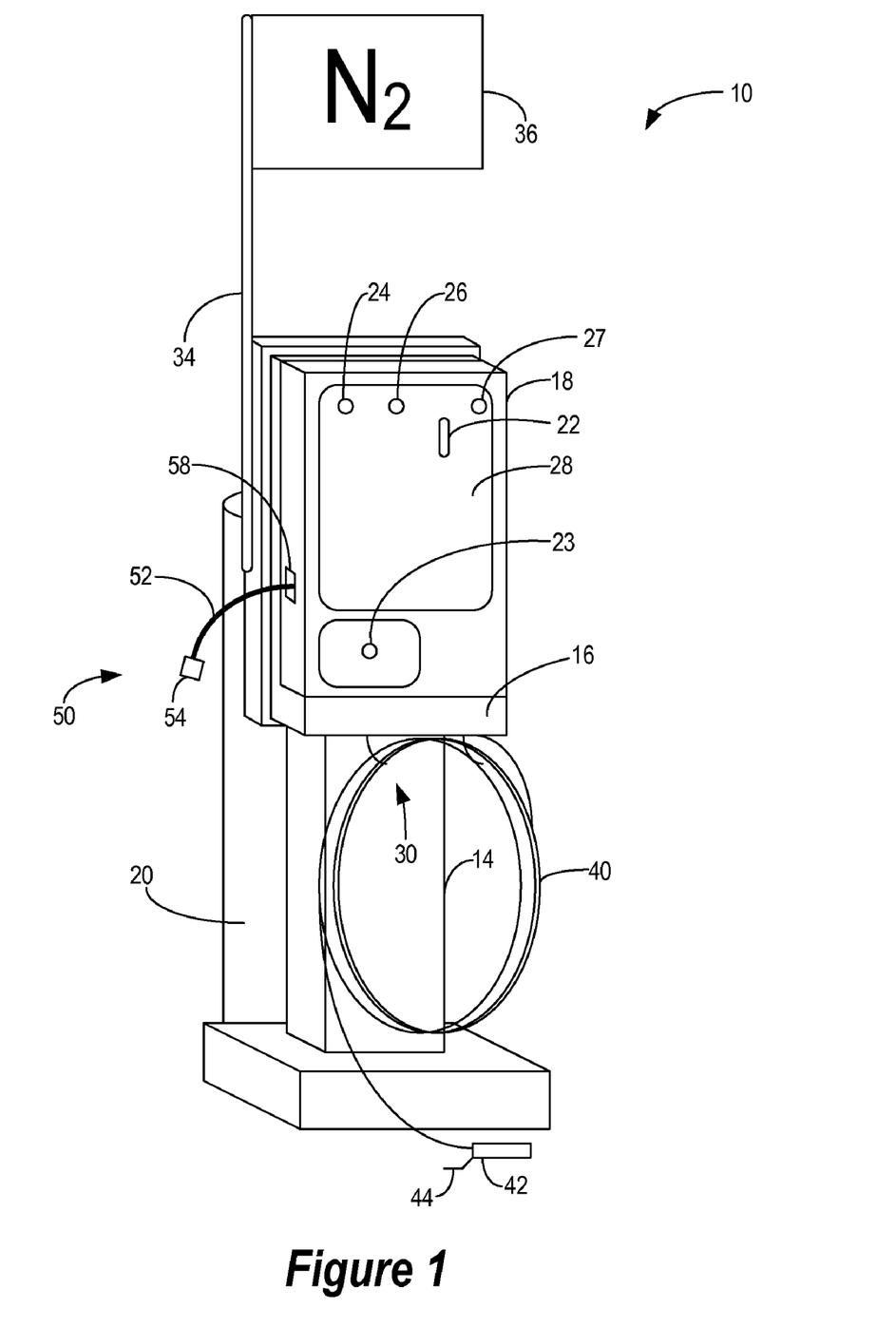
FIG. 1 is a perspective view of a nitrogen inflation system according to an exemplary embodiment of the present disclosure.

Referring to FIG. 1, a perspective view of a nitrogen inflation system 10 is illustrated according to an exemplary embodiment of the present disclosure. The nitrogen inflation system 10 includes a pedestal 14, a lower housing 16, an upper housing 18, and a storage device 20. In one exemplary embodiment, the pedestal 14, the lower housing 16, and the upper housing 18 include a decommissioned pay phone which is retrofitted into the nitrogen inflation system 10. Alternatively, the pedestal 14, the lower housing 16, and the upper housing 18 can include new components.

The pedestal 14 is configured to rest on the ground. The pedestal 14 includes a support base which extends vertically to the lower housing 16. The lower housing 16 is connected to and supported by the pedestal 14, and the upper housing 18 is connected to and removable from the lower housing 16. For example, these various components (14, 16, 18) can be attached through a screw and not or they can be integrally formed as a single component.

The storage device 20 is configured to store a gas, such as Nitrogen, $N_2$, and is attached to the pedestal 14. For example, the storage device 20 can include a commercially available gas cylinder. Further, the storage device 20 can be refillable or replaceable. If refillable, additional gas can be added periodically or when required. If replaceable, the storage device 20 can be removed when empty or periodically and replaced with another storage device 20 which is full. In either case, the storage device 20 is secured to one of the pedestal 14, the lower housing 16, and the upper housing 18 to prevent unauthorized removal. Optionally, a lockable cover (not shown) can be placed over the lower housing 16, and the upper housing 18, and the storage device 20.

Advantageously, the storage device 20 provides a cost-effective way to delivery nitrogen and other gases without the requirement to include costly components to make pure nitrogen. For example, the nitrogen inflation system 10 does not require expensive filtration systems to provide $N_2$ from ambient air. This enables the placement at the nitrogen inflation system 10 at locations other than tire retailers, such as gas stations, convenience stores, car washes, and the like.

The upper housing 18 includes a payment device 22, a vault door 23, a first indicator 24, a second indicator 26, a storage device status indicator 27, a front panel 28, and a rack 30. The interior of the upper housing 18 include electronics configured to accept payment and accordingly dispense gas from the storage device 20. For example, these electronics can include a regulator, a timer, and the like.

The payment device 22 is configured to receive a payment from a user to activate the nitrogen inflation system 10. For example, the payment device 22 can include a coin acceptor from a decommissioned pay phone. Alternatively, the payment device 22 can include a bill acceptor, credit card reader, or the like. The payment device 22 is connected to the electronics. The vault door 23 can be configured to open to the interior of the upper housing 18 to provide access to the money in the payment device 22. In an exemplary embodiment, the payment device 22 can include a bill reader to accept various denominations of paper currency (e.g., $1, $5, $10, etc.) for payment. Additionally, the payment device 22 can include a card dispenser which can be configured to dispense a card with each payment. For example, the card can be used to obtain a $N_2$ dust cap for tires, such as inside a convenience store.

The first and second indicators 24, 26 can include light-emitting diodes (LED) or the like, and is operable to visual inform a user that the system is powered up, active, inactive, and the like. For example, one of the indicators 24, 26 can provide a notification of system power, and the second of the indicators 24, 26 can become active upon payment, providing an indication to the user that the system 10 is ready to dispense nitrogen or the like. The storage device status indicator 27 can include an LED and can be configured to provide a status indication of the storage device 20, i.e. whether the device 20 contains $N_2$ or needs to be refilled. For example, the storage device status indicator 27 can be connected to a pressure switch on a regulator.

The front panel 28 can be configured to open to the interior of the housing 18 to provide access to the interior components and electronics. This can be for repair or maintenance. Optionally, a display can be included on the front panel 28 providing instructions to the user on how to operate the system 10. Also, the display could include a description of the benefits associated with using nitrogen filled tires.

The rack 30 is configured to hold and store a hose 40. The hose 40 is configured to dispense a gas, such as nitrogen, from the storage device 20. The hose 40 can include an air nozzle 42 and a dispensing handle 44. The nozzle 42 is configured to be placed on a tire valve stem (not shown), such as by being screwed or placed over the valve stem, and the dispensing handle 44 is utilized to start dispensing of a gas, such as nitrogen, from the storage device 20. Also, the air nozzle 42 can include a pressure gauge to allow a user to determine air pressure.

The present disclosure includes a valve core extractor 50 for quickly deflating a tire filed with ambient air, i.e. to replace the ambient air with nitrogen. The valve core extractor 50 can include a cable 52, and a deflator tool 54. The valve core extractor 50 includes a tool to extract the valve core from the tire valve stem to open up the valve core to quickly deflate a tire, such as within 10-15 s. The cable 52 secures the tire deflator to the system 10, and is sized accordingly to bring the valve core extractor 50 to each tire on a vehicle. For example, the cable 52 can be attached to a recoil device 58 stored inside the housing 18 and is removed through an opening in the upper housing 18 (e.g., the opening previously used for a payphone handset). The pressure gauge 56 can be used to measure tire pressure. Further, the nozzle 42 can also include a pressure gauge.

Figure 2:
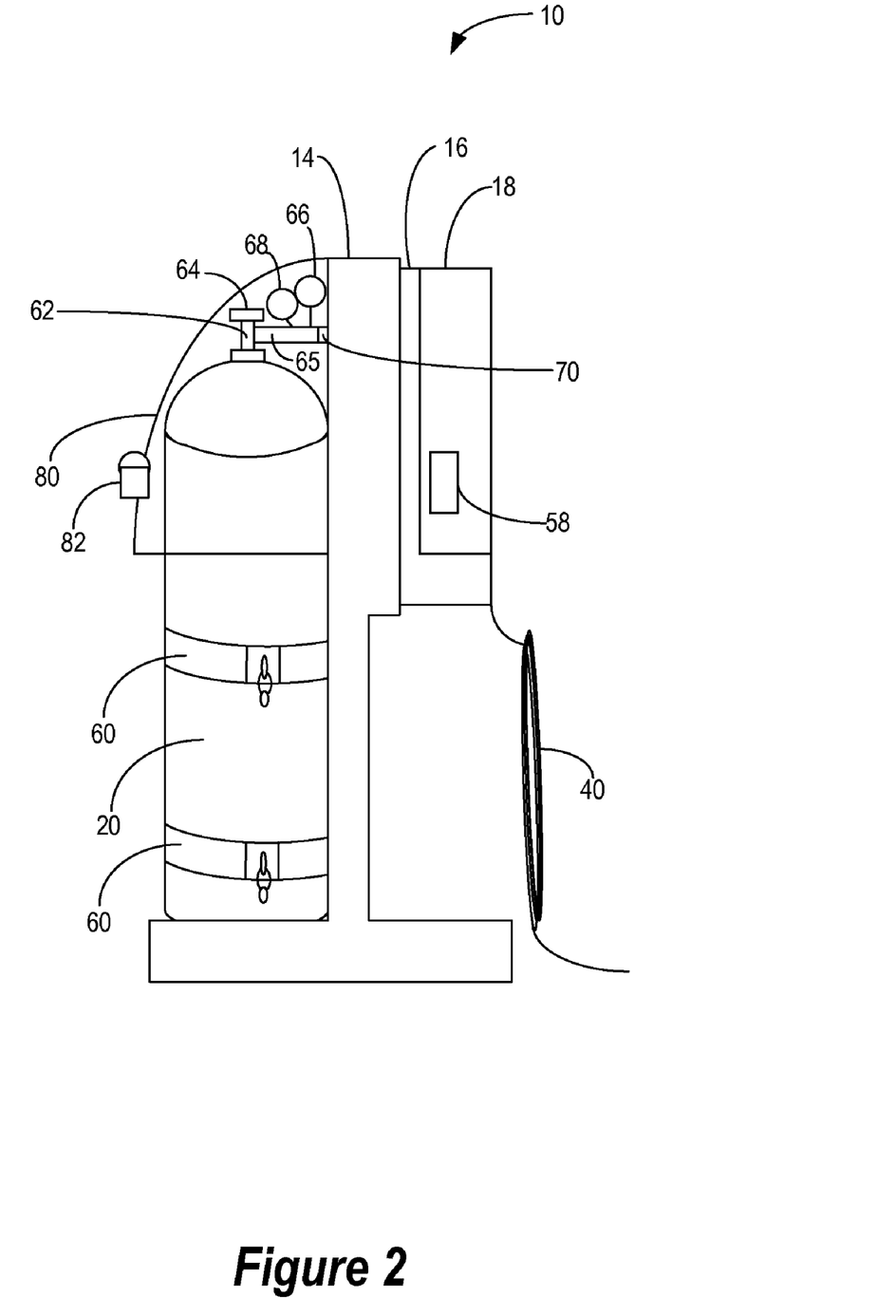
FIG. 2 is a side view of the nitrogen inflation system of FIG. 1 according to an exemplary embodiment of the present disclosure.

Referring to FIG. 2, a side view of the nitrogen inflation system 10 illustrates the relationship of the storage device 20 to the components 14, 16, 18 according to an exemplary embodiment of the present disclosure. The storage device 20 is removably attached to the components 14, 16, 18 through a security attachment 60. In the example of FIG. 2, the storage device 20 is secured to the pedestal 14 through the secured attachment 60. The security attachment 60 can include a strap, chain, bolt, etc. and a lock/disconnect device, such as a padlock, key lock, etc. The storage device 20 can be secured to the components 14, 16, 18 in a variety of other configurations as are well known in the art.

The storage device 20 includes a stem 62, a valve 64, and an inert gas regulator 65 including gauges 66, 68. The stem 62 protrudes from an opening in the storage device 20, and the valve 64 is connected to the stem 62. The valve 64 is configured to control the flow of gas from the storage device 20. A hose 70 connects to an opening in the regulator 65 at one end to the interior of the housing 18 at the other end. The hose 70 expels gas from the storage device 20 responsive to the valve 64 position. The gauges 66, 68 of the regulator 65 can be configured to provide a visual indication of gas pressure and pressure in the storage device 20.

Optionally, a tank cover 80 can be included over the top of the storage device 20 covering the stem 62, valve 64, the regulator 65, gauges 66, 68, and hose 70. The tank cover 80 can be locked in place with a lock 82. The lock 82 can include a key, combination, or the like accessible only by an operator for maintenance or refilling. The tank cover 80 can include a weather-resistant material such as stainless steel or the like, and is configured to protect the stem 62, the valve 64, and the gauges 66, 68 on the storage device 20.

Figure 3:
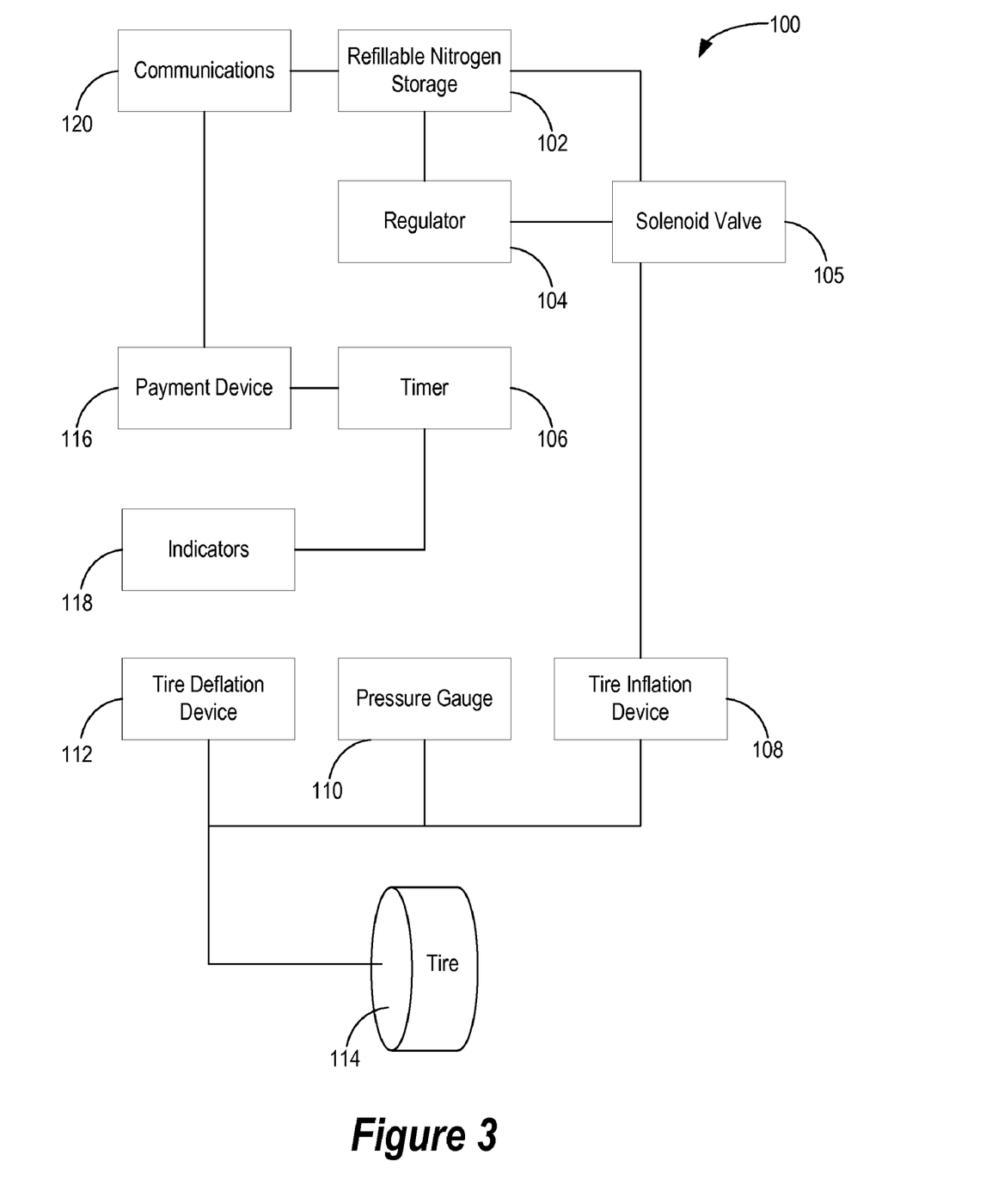
FIG. 3 is a functional block diagram of a nitrogen inflation system according to an exemplary embodiment of the present disclosure.

Referring to FIG. 3, a functional block diagram illustrates a nitrogen inflation system 100 according to an exemplary embodiment of the present disclosure. A refillable nitrogen storage device 102 is connected to a regulator 104. The refillable nitrogen storage device 102 contains nitrogen gas, and can be refilled as needed. The regulator 104 is connected to a solenoid valve 105 that is connected to a timer 106 configured to dispense a set amount of nitrogen from the storage device 102 using the regulator 104. A tire inflation device 108 is also connected to the storage device 102 and is configured to dispense nitrogen gas. Additionally, the nitrogen inflation system 100 includes a pressure gauge 110 and a tire deflation device 112. The devices 108, 112 and gauge 110 are configured to attach to a tire 114 or the like. A payment device 116 is configured to accept payment, i.e. money, and control the system 100 to dispense nitrogen accordingly. Indicators 118 provide a user with notification of system operation, system status, and the like. Optionally, communications 120 can be included to notify an operator of low nitrogen in the storage 102, problems with the payment device 116, and the like.

A user can utilize the nitrogen inflation system 100 to both deflate the tire 114 filled with ambient air, and then refill the tire 114 with nitrogen gas. For example, the user can utilize the tire deflation device 112 to remove existing ambient air from the tire 114. The pressure gauge 110 can be used to ensure the proper inflation pressure. Next, the user can insert a payment (e.g., paper money, coins, credit card, prepaid card, etc.) into the payment device 116 to activate the nitrogen inflation system 100. Responsive to the payment, the timer 106 drives the solenoid valve 105 to dispense nitrogen gas from the refillable nitrogen storage 102 to the tire inflation device 108 (attached to the tire 114) for a predetermined time period.

Figure 4:
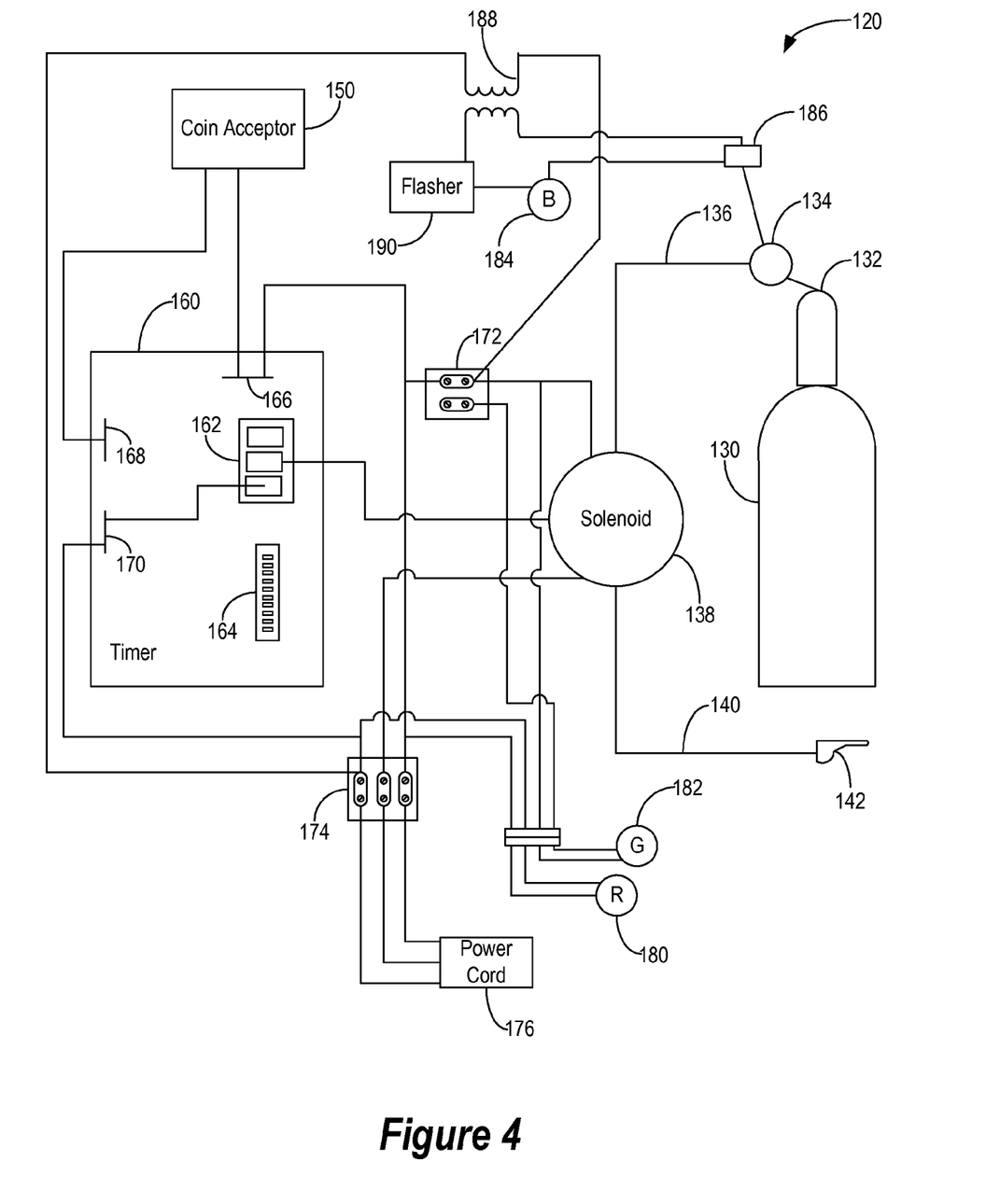
FIG. 4 is a wiring diagram of a nitrogen inflation system according to an exemplary embodiment of the present disclosure.

Referring to FIG. 4, a wiring diagram of an exemplary dispensing system 120 is illustrated. The dispensing system 120 includes a gas storage device 130 with a gas dispensing connection 132, a regulator 134, and a hose 136 connected to a solenoid 138. The solenoid 138 is configured to dispense gas from the storage device 130, and connects to a hose 140 with a dispenser 142 at the termination point. In an exemplary embodiment, the dispensing system 120 is a converted payphone which has been decommissioned.

A coin acceptor 150 is configured to receive money. For example, the coin acceptor 150 can be from the decommissioned payphone. Alternatively, the coin acceptor 150 can be any other payment mechanism known in the art. A timer 160 is connected to the coin acceptor 150 and the solenoid 138. The timer 160 is configured to operate the solenoid 138 responsive to receiving money in the coin acceptor 150. The timer 160 includes various connections 162, 166, 168, 170 and a setting switch 164. The setting switch 164 can include DIP switches which are set to activate the timer for a predetermined period based on a specific amount of payment. The connection 162 connects to the solenoid 138 for activation. Wiring blocks 172, 174 connect the timer 160 to the solenoid 138, a power cord 178, and indicator LEDs 180, 182.

A bulb 184 can be utilized to provide an indication of low pressure in the gas storage device 130. A pressure sensor 186 can be connected to the regulator 134. The pressure sensor 186 can form a circuit with the bulb 184, an inductor 188, and a flasher 190. The inductor 188 is operable to convert 120V AC to 12 VDC to power the bulb 184. The flasher 190 is configured to cause the bulb 184 to flash, and can include, for example, an automotive flasher.

Figure 5:
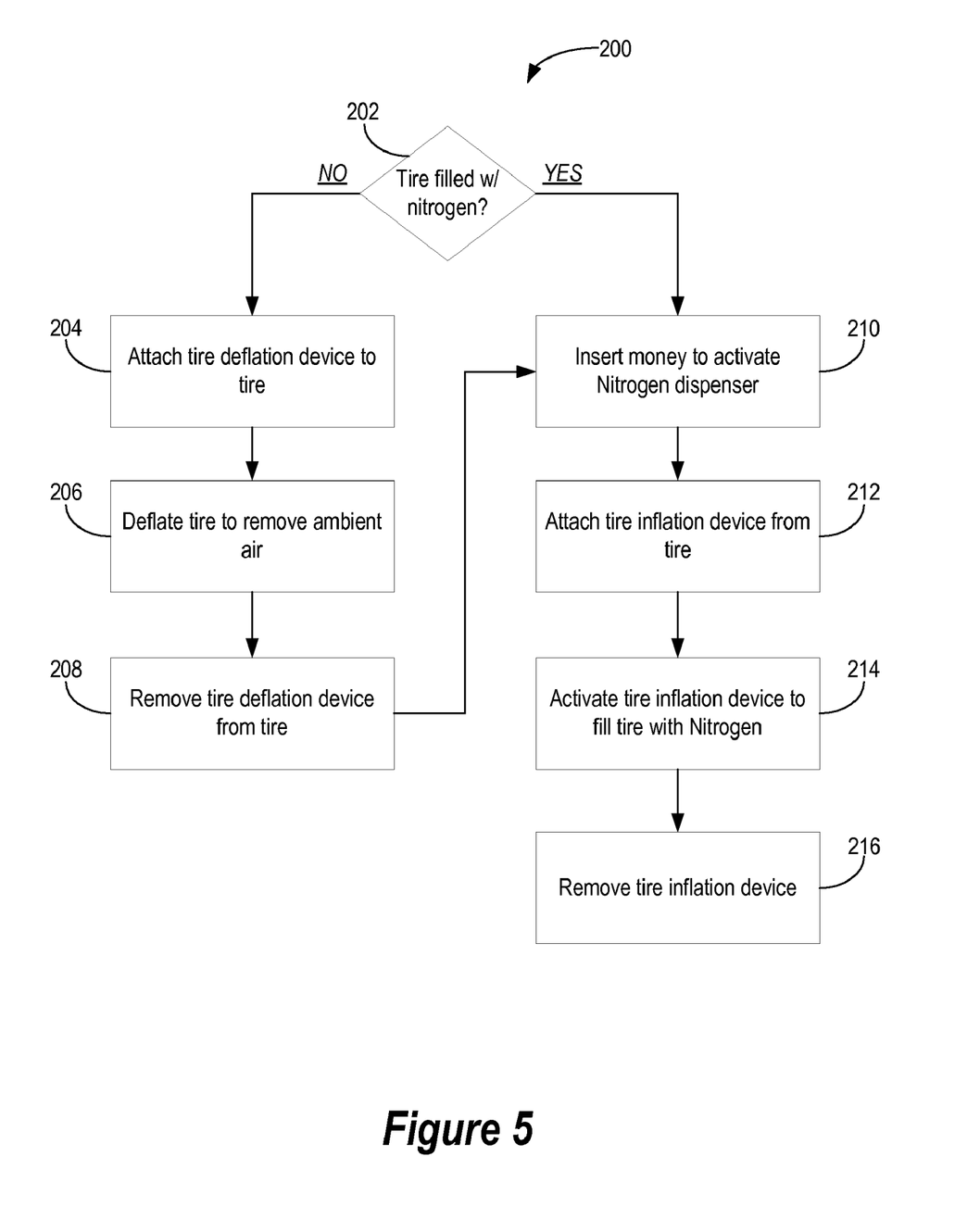
FIG. 5 is a flow chart illustrating an exemplary embodiment of the present disclosure to deflate a tire with compressed air and inflate the tire with nitrogen.

Referring to FIG. 5, a method 200 for utilizing a nitrogen tire inflation system according to an exemplary embodiment of the present disclosure is illustrated. First, it is determined if the existing tire is filled with nitrogen gas or not (step 202). If not, then a tire deflation device is attached to a tire (step 204). The tire is then deflated to remove ambient air or the like before proceeding with nitrogen inflation (step 206). Once deflated, the tire deflation device is removed from the tire (step 208).

If the tire is filled with nitrogen or empty, then a user inserts money or other payment mechanisms to activate a nitrogen dispenser (step 210). Next, a tire inflation device is attached to the tire (step 212). The tire inflation device is activated to fill the tire with nitrogen gas (step 214). A pressure gauge can be utilized to ensure a proper fill based on predetermined criteria. When complete, the tire inflation device is removed (step 216).

Figure 6:
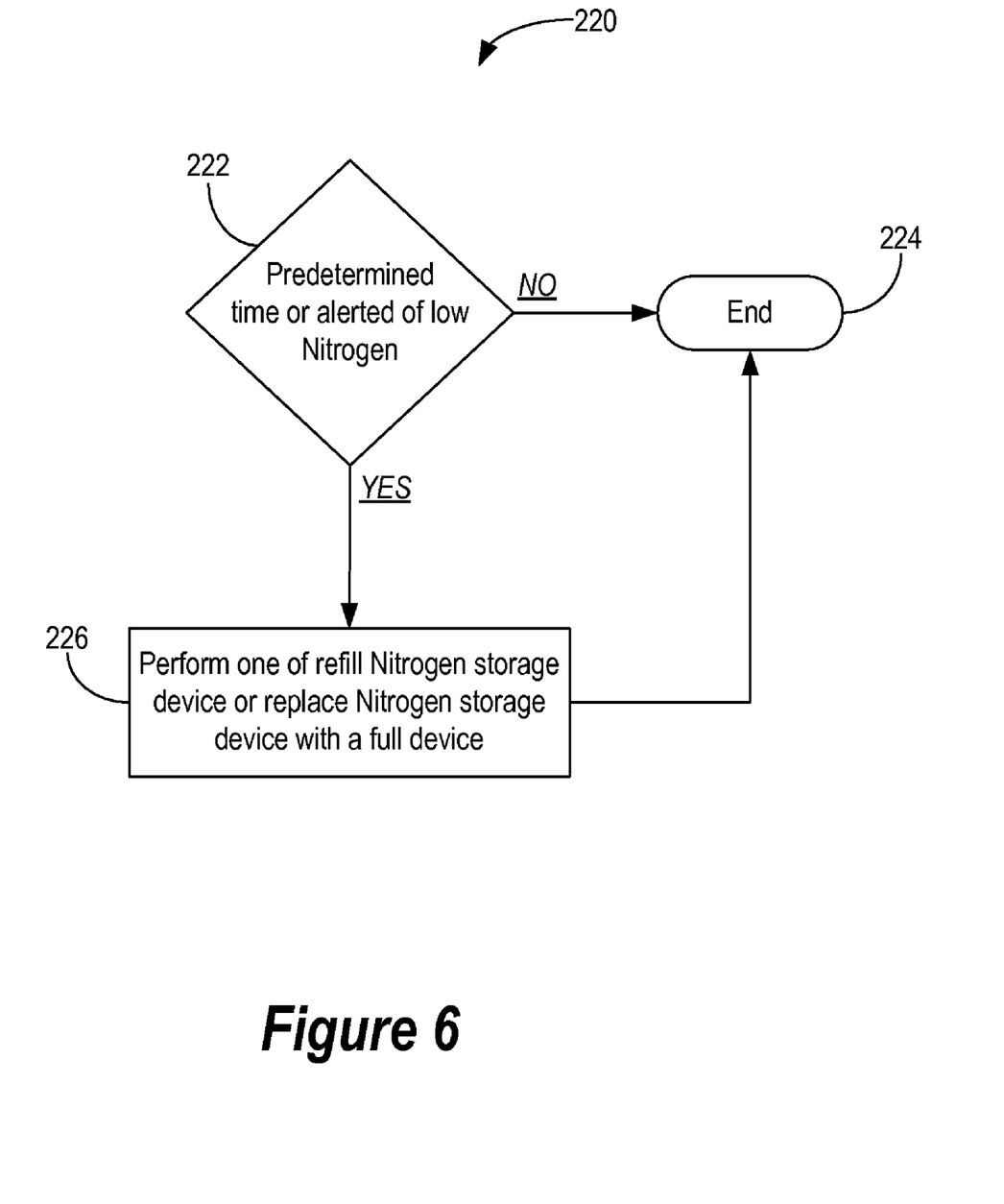
FIG. 6 is a flow chart illustrating an exemplary embodiment of the present disclosure to refill or replace a low nitrogen storage device.

Referring to FIG. 6, a method 220 for managing nitrogen storage in a nitrogen tire inflation system according to an exemplary embodiment of the present disclosure is illustrated. The method 220 checks to see if a predetermined time has been met or an alert has been provided of low nitrogen (step 222). If neither has occurred, then the method 220 ends (step 224), indicating the nitrogen tire inflation system does not require additional nitrogen. If one of the conditions has occurred, then either a refill or replacement of a nitrogen storage device is performed (step 226).

Figure 7:
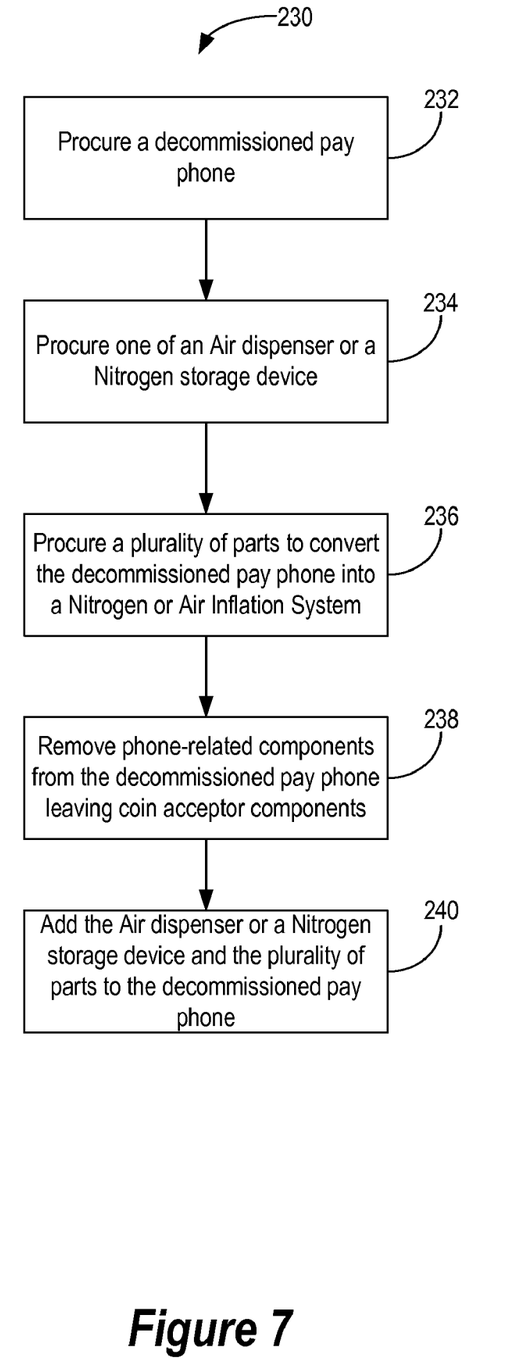
FIG. 7 is a flow chart illustrating an exemplary embodiment of the present disclosure to convert a decommissioned pay phone into a nitrogen or air inflation system.

Referring to FIG. 7, a method 230 for converting a decommissioned pay phone to a nitrogen or air tire inflation system according to an exemplary embodiment of the present disclosure is illustrated. First, a decommissioned pay phone is procured (step 232). One of an air dispenser or a nitrogen storage device is procured (step 234). A plurality of parts are procured to convert the decommissioned pay phone into a nitrogen or air inflation system (step 236). The phone-related components are removed from the decommissioned pay phone except coin acceptor components (step 238). For example, the coin acceptor components can be utilized in the nitrogen or air inflation system. The air dispenser or Nitrogen storage device and the plurality of parts are added to the decommissioned pay phone (step 240).

Figure 8:
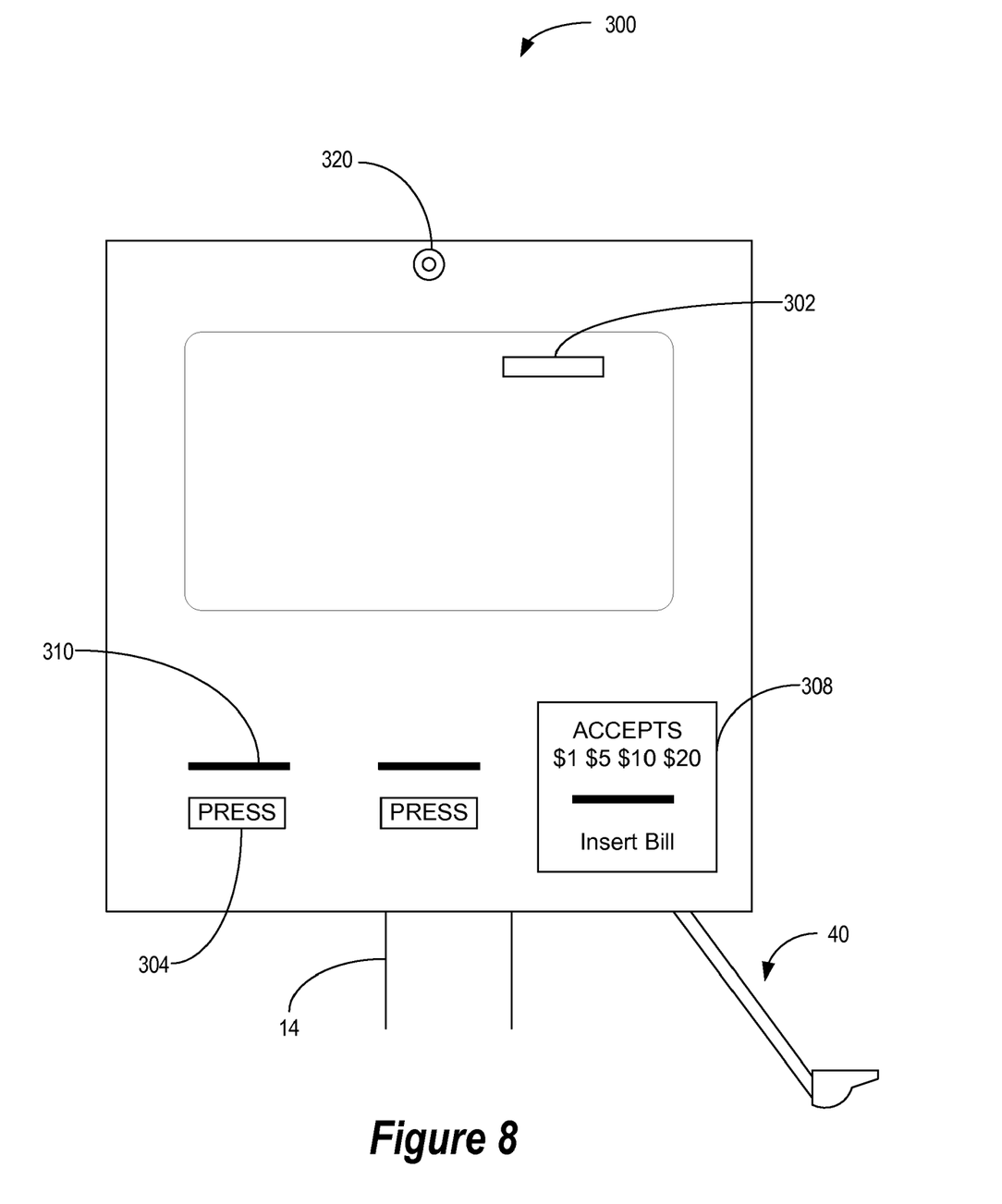
FIG. 8 is a diagram of a prepaid card dispenser for providing payment to a nitrogen gas dispenser according to an exemplary embodiment of the present disclosure.
Figure 9:
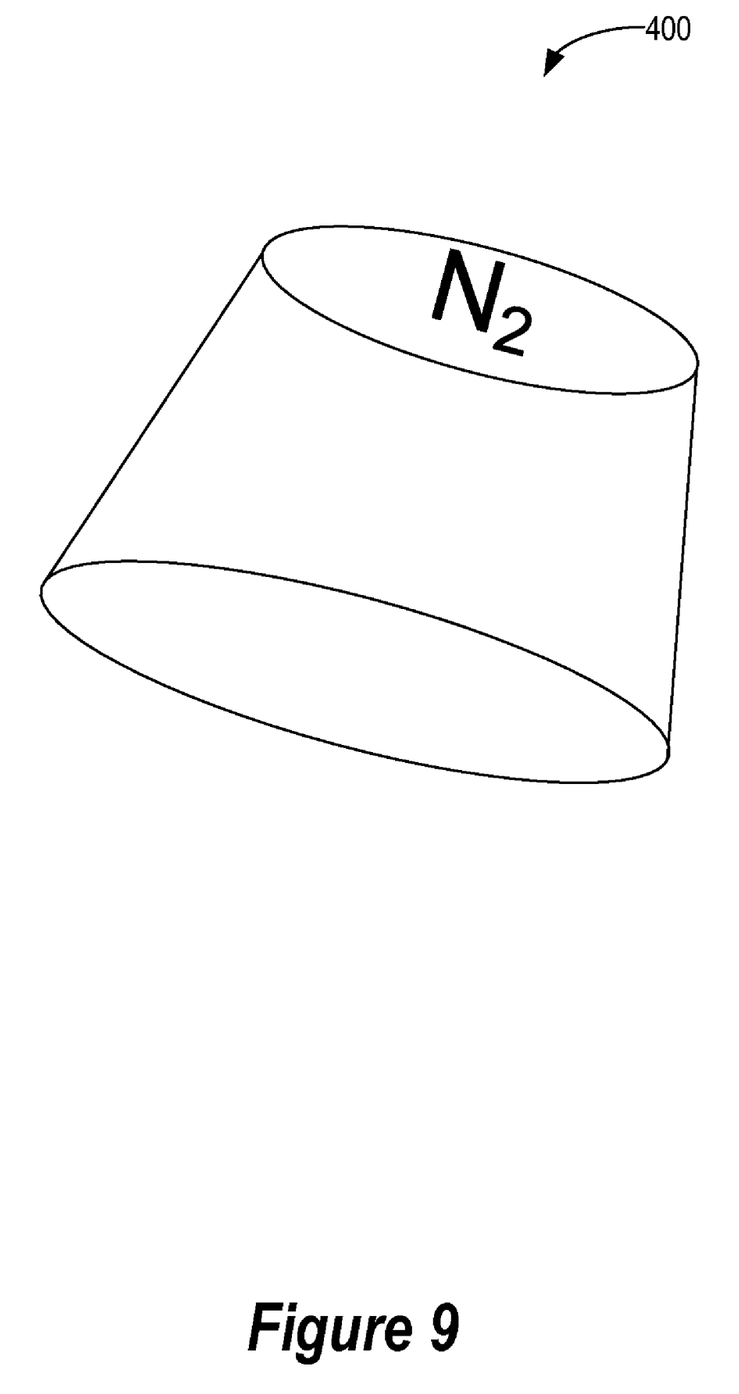
FIG. 9 is a diagram of a dust cap for a tire according to an exemplary embodiment of the present disclosure.

Referring to FIG. 8, a card dispenser 300 is illustrated for providing payment to a nitrogen gas dispenser according to an exemplary embodiment of the present invention. With the decommissioning of payphones, existing prepaid telephone card dispensers are becoming obsolete. The wireless phone industry has also been providing prepaid wireless services. Accordingly, decommissioned prepaid card dispensers can be retrofitted as part of the present disclosure to provide a payment mechanism for the nitrogen gas dispenser. For example, the card dispenser 300 can be used in lieu of the upper housing 18 in FIG. 1 to provide a mechanism to accept payment though currency. Additionally, the card dispenser 300 can also be configured to dispense a card with each fill. This card can be used to provide a user with an entitlement to a free $N_2$ dust cap (such as illustrated in FIG. 9). Advantageously, the card can provide a mechanism to get a user of the card dispenser 300 inside a convenience store to pick up the free dust cap, and potentially make other purchases.

Advantageously, existing prepaid telephone card dispensers can be easily retrofitted to provide nitrogen gas. The existing hardware and control mechanisms of the prepaid telephone card dispensers do not need to be altered. Rather, existing settings can be set to determine an amount of nitrogen dispensed.

FIG. 8 illustrates an exemplary card dispenser 300. The prepaid card dispenser 300 includes a display screen 302, buttons 304, a payment mechanism 308, and a card dispenser 310. The display 302 provides a user with instructions and can guide the user to begin nitrogen inflation after payment. The buttons 304 allow the user to select a value amount for a prepaid card. The payment mechanism 308 can include a credit card reader, a bill acceptor, or the like to receive monetary payment for nitrogen. Finally, the dispenser 310 can provide a card for a free $N_2$ dust cap for each tire.

Referring to FIG. 9, optionally, the prepaid card dispenser 300 can also dispense a tire dust cap 400 with a nitrogen gas logo on it. The tire dust cap 400 can be placed over a tire's valve to signify the tire is filled with nitrogen gas instead of ambient air.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A tire inflation system, comprising:
a housing comprising a plurality of status indicators configured to provide a visual status representation;
a refillable gas storage device disposed to the housing;
a regulator disposed to the refillable gas storage device, wherein the regulator is configured to dispense gas from the gas storage device responsive to a payment;
a payment mechanism disposed within the housing, wherein the payment mechanism is configured to receive the payment;
an inflation device moveably attached to the housing and connected to the regulator and the refillable gas storage device, wherein the inflation device is configured to attach to a valve and dispense the gas through the valve; and
a communication mechanism configured to notify an operator responsive to a low fill in the refillable gas storage device;
wherein a first indicator of the plurality of status indicators provides an indication that the tire inflation system is in service;
wherein a second indicator of the plurality of status indicators provides a visual representation of a fill state of the refillable gas storage device; and
wherein a third indicator is connected to a pressure sensor configured to measure pressure in the refillable gas storage device.

2. The tire inflation system of claim 1, wherein the gas comprises nitrogen gas.

3. The tire inflation system of claim 2, further comprising:
a deflation device moveably attached to the housing, wherein the deflation device is configured to deflate a tire.

4. The tire inflation system of claim 1, wherein the housing is constructed from a decommissioned payphone.

5. The tire inflation system of claim 4, wherein the payment mechanism comprises a coin acceptor; and
wherein the regulator is driven by a timer connected to the coin acceptor within the housing.

6. The tire inflation system of claim 1, wherein the payment mechanism comprises any of a coin acceptor, a bill acceptor, a credit card reader, a debit card reader, and a prepaid card reader.

7. The tire inflation system of claim 6, wherein the payment mechanism is configured to dispense a card for a dust cap for each tire filled.

8. A nitrogen tire inflation system, comprising:
a payphone housing;
a refillable nitrogen gas storage device disposed to the payphone housing;
a regulator disposed to the refillable nitrogen gas storage device, wherein the regulator is configured to dispense nitrogen gas through a hose from the refillable nitrogen gas storage device responsive to a payment;
a payment mechanism disposed within the payphone housing, wherein the payment mechanism is configured to receive the payment; and
an inflation device moveably attached to the housing through the hose and connected to the regulator and the refillable nitrogen gas storage device, wherein the inflation device is configured to attach to a tire valve and dispense the nitrogen gas through the tire valve.

9. The nitrogen tire inflation system of claim 8, further comprising:
a deflation device moveably attached to the housing through a cord, wherein the deflation device is configured to deflate a tire to remove ambient air prior to filling the tire with nitrogen gas.

10. The nitrogen tire inflation system of claim 8, wherein the payment mechanism comprises a coin acceptor in the payphone housing from a decommissioned payphone; and
wherein the regulator is driven by a timer connected to the coin acceptor within the payphone housing.

11. The nitrogen tire inflation system of claim 8, wherein the payphone housing comprises:
a plurality of status indicators configured to provide a visual status representation;
wherein the plurality of status indicators comprise light emitting diodes;
wherein a first indicator of the plurality of status indicators provides an in service indication;
wherein a second indicator of the plurality of status indicators provides a an indication that payment is accepted and gas is ready to dispense; and
wherein a third indicator of the plurality of status indicators provides a tank low indication.

12. The nitrogen tire inflation system of claim 11, wherein the third indicator is connected to a pressure sensor configured to measure pressure in the refillable gas storage device; and
wherein the nitrogen tire inflation system further comprises a communication mechanism configured to notify an operator responsive to a low fill in the refillable nitrogen gas storage device.

13. The nitrogen tire inflation system of claim 8, wherein the payment mechanism comprises a bill reader;
wherein the bill reader is configured to accept paper currency; and
wherein the bill reader comprises a prepaid card dispenser converted from a decommissioned phone card dispenser.

14. A method of converting decommissioned payphone equipment into a tire inflation system, comprising:
procuring a decommissioned payphone;
removing phone-related components from the decommissioned payphone;
adding a gas storage tank to the decommissioned payphone;
procuring a plurality of parts to regulate gas dispensing from the gas storage tank responsive to a payment; and
adding the plurality of parts to the decommissioned payphone.

15. The method of claim 14, further comprising:
procuring a decommissioned prepaid phone card dispenser; and
converting the decommissioned prepaid phone card dispenser to dispense nitrogen and cards for a dust cap.

16. The method of claim 14, further comprising:
filling the gas storage tank with nitrogen gas.

* * * * *